United States Patent
Lee et al.

(10) Patent No.: US 11,454,496 B2
(45) Date of Patent: Sep. 27, 2022

(54) OBJECT RECOGNITION APPARATUS AND OPERATION METHOD THEREOF

(71) Applicant: SAMSUNG ELECTRONICS CO., LTD., Suwon-si (KR)

(72) Inventors: Suyeon Lee, Seoul (KR); Unjeong Kim, Osan-si (KR); Hyuck Choo, Yongin-si (KR); Seungju Han, Seoul (KR); Hyochul Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/952,959

(22) Filed: Nov. 19, 2020

(65) Prior Publication Data
US 2021/0223031 A1   Jul. 22, 2021

(30) Foreign Application Priority Data

Jan. 21, 2020   (KR) .......................... 10-2020-0007962

(51) Int. Cl.
*G01B 11/25* (2006.01)
*G01J 3/28* (2006.01)
*G01J 3/02* (2006.01)
*G06K 9/62* (2022.01)
*G06V 40/16* (2022.01)

(52) U.S. Cl.
CPC .......... *G01B 11/254* (2013.01); *G01J 3/0294* (2013.01); *G01J 3/2823* (2013.01); *G06K 9/6267* (2013.01); *G06K 9/6293* (2013.01); *G06V 40/165* (2022.01); *G01J 2003/2826* (2013.01)

(58) Field of Classification Search
None
See application file for complete search history.

(56) References Cited

U.S. PATENT DOCUMENTS

| 6,075,594 A | 6/2000 | Thomas et al. |
| 6,269,182 B1 | 7/2001 | Ishii |

(Continued)

FOREIGN PATENT DOCUMENTS

| CN | 102262054 A | 11/2011 |
| JP | 2004340978 A | 12/2004 |

(Continued)

OTHER PUBLICATIONS

Communication dated May 26, 2021 issued by the European Intellectual Property Office in counterpart European Application No. 20213835.0.

*Primary Examiner* — Shawn Decenzo
(74) *Attorney, Agent, or Firm* — Sughrue Mion, PLLC

(57) ABSTRACT

An object recognition apparatus includes a first spectrometer configured to obtain a first type of spectrum data from light scattered, emitted, or reflected from an object; a second spectrometer configured to obtain a second type of spectrum data from the light scattered, emitted, or reflected from the object, the second type of spectrum data being different from the first type of spectrum data; an image sensor configured to obtain image data of the object; and a processor configured to identify the object using data obtained from at least two from among the first spectrometer, the second spectrometer, and the image sensor and using at least two pattern recognition algorithms.

18 Claims, 9 Drawing Sheets

(56) References Cited

U.S. PATENT DOCUMENTS

| | | | |
|---|---|---|---|
| 6,535,637 | B1 | 3/2003 | Wootton et al. |
| 7,532,320 | B2 * | 5/2009 | Neiss .................. G01J 3/02 |
| | | | 356/301 |
| 7,602,942 | B2 | 10/2009 | Bazakos et al. |
| 8,411,909 | B1 | 4/2013 | Zhao et al. |
| 8,547,540 | B2 * | 10/2013 | Beckstead .............. G01J 3/28 |
| | | | 356/73.1 |
| 9,217,670 | B2 | 12/2015 | Kim et al. |
| 9,316,537 | B2 | 4/2016 | Bamber et al. |
| 9,959,628 | B2 | 5/2018 | Mutti et al. |
| 10,820,826 | B2 | 11/2020 | Ji et al. |
| 2011/0080581 | A1 * | 4/2011 | Bhargava ............. G01J 3/0289 |
| | | | 356/302 |
| 2012/0002250 | A1 | 1/2012 | Qi |
| 2012/0140981 | A1 | 6/2012 | Berkman et al. |
| 2014/0319351 | A1 * | 10/2014 | Yamada ............ G01N 21/8901 |
| | | | 250/339.02 |
| 2015/0185207 | A1 * | 7/2015 | Black .................. A61B 5/6826 |
| | | | 435/29 |
| 2018/0172431 | A1 * | 6/2018 | Okamoto ............ G01J 3/0248 |
| 2018/0172510 | A1 * | 6/2018 | Rosen ................. G01J 3/0256 |
| 2019/0195803 | A1 * | 6/2019 | Liu ...................... G01J 3/0205 |
| 2019/0293620 | A1 * | 9/2019 | Farkas ................. G01N 21/65 |
| 2019/0370586 | A1 | 12/2019 | Otsuki |
| 2020/0116567 | A1 * | 4/2020 | Yoon .................. G01N 21/274 |

FOREIGN PATENT DOCUMENTS

| | | |
|---|---|---|
| JP | 2018096834 A | 6/2018 |
| JP | 2018181204 A | 11/2018 |
| KR | 1020150072049 A | 6/2015 |
| KR | 10-1793609 B1 | 11/2017 |

* cited by examiner

OBJECT RECOGNITION APPARATUS AND OPERATION METHOD THEREOF

CROSS-REFERENCE TO RELATED APPLICATION

This application is based on and claims priority under 35 U.S.C. § 119 to Korean Patent Application No. 10-2020-0007962, filed on Jan. 21, 2020, in the Korean Intellectual Property Office, the disclosure of which is incorporated by reference herein in its entirety.

BACKGROUND

1. Field

The disclosure relates to object recognition apparatuses and operation methods thereof.

2. Description of Related Art

A technology of obtaining information about an object and recognizing the object based on the obtained information is widely used not only for analyzing the characteristics of an object, such as drug classification, food analysis, and analysis of pollutants in a living environment but also for identifying an object, such as face recognition. The development of various types of pattern recognition algorithms makes it possible to use an apparatus to automatically recognize an object without user intervention.

SUMMARY

The disclosure provides object recognition apparatuses and operation methods thereof. Any technical solutions of the disclosure are not limited to the above-described technical problems, and other technical problems may be deduced from the following embodiments.

Additional aspects will be set forth in part in the description which follows and, in part, will be apparent from the description, or may be learned by practice of the presented embodiments of the disclosure.

According to an aspect of an embodiment, an object recognition apparatus includes a first spectrometer configured to obtain a first type of spectrum data from light scattered, emitted, or reflected from an object; a second spectrometer configured to obtain a second type of spectrum data different from the first type of spectrum data; an image sensor configured to obtain image data of the object; and a processor configured to identify the object using data obtained from at least two of the first spectrometer, the second spectrometer, and the image sensor and at least two pattern recognition algorithms. In accordance with an aspect of the disclosure, an object recognition apparatus includes a first spectrometer configured to obtain a first type of spectrum data from light scattered, emitted, or reflected from an object; a second spectrometer configured to obtain a second type of spectrum data from the light scattered, emitted, or reflected from the object, the second type of spectrum data being different from the first type of spectrum data; an image sensor configured to obtain image data of the object; and a processor configured to identify the object using data obtained from at least two from among the first spectrometer, the second spectrometer, and the image sensor and using at least two pattern recognition algorithms.

Light of a first wavelength band and light of a second wavelength band may be irradiated to the object, the first spectrometer may be configured to obtain the first type of spectrum data by measuring the light scattered or emitted from the object in a wavelength band different from the first wavelength band, and the second spectrometer may be configured to obtain the second type of spectrum data by measuring the light reflected from the object in the second wavelength band.

Light of a first wavelength band and light of a second wavelength band different from the first wavelength band may be irradiated to the object, the first spectrometer may be configured to obtain the first type of spectrum data by measuring the light scattered or emitted from the object in a wavelength band different from the first wavelength band, and the second spectrometer may be configured to obtain the second type of spectrum data by measuring the light scattered or emitted from the object in a wavelength band different from the second wavelength band.

The first type of spectrum data may include a Raman spectrum, and the second type of spectrum data may include at least one from among a visible spectrum, a fluorescence spectrum, a microwave spectrum, an infrared spectrum, and an X-ray spectrum.

The object recognition apparatus may further include a first light source used together with the first spectrometer to obtain the first type of spectrum data; and a second light source used together with the second spectrometer to obtain the second type of spectrum data, wherein a full width at half maximum of light irradiated by the first light source is $\frac{1}{100}$ or less of a center wavelength of the first light source, and wherein a full width at half maximum of light irradiated by the second light source is $\frac{1}{3}$ or more of a center wavelength of the second light source.

The at least two pattern recognition algorithms may include a first pattern recognition algorithm that uses data obtained from one from among the first spectrometer, the second spectrometer, and the image sensor as input data and a second pattern recognition algorithm that uses data obtained from a different one from among first spectrometer, the second spectrometer, and the image sensor as input data, and the processor may be further configured to, when a first estimation result obtained by using the first pattern recognition algorithm and a second estimation result obtained by using the second pattern recognition algorithm have a same format, determine a final estimation result as a weighted sum of the first estimation result and the second estimation result.

Each of the first estimation result, the second estimation result, and the final estimation result may include a vector comprising a plurality of components, wherein each component from the plurality of components corresponds to a probability value for classifying characteristics of the object into a plurality of predefined classes, and the processor may be further configured to, for each of the first estimation result and the second estimation result, determine a difference between a highest probability value in the vector and a second-highest probability value in the vector; and apply a higher weight to the estimation result having the larger difference.

The at least two pattern recognition algorithms may include a first pattern recognition algorithm that uses data obtained from one from among the first spectrometer, the second spectrometer, and the image sensor as input data and a second pattern recognition algorithm that uses data obtained from a different one from among first spectrometer, the second spectrometer, and the image sensor as input data, and the processor may be further configured to, when a first estimation result obtained by using the first pattern recognition algorithm and a second estimation result obtained by using the second pattern recognition algorithm have different formats, identify the object by synthesizing a first characteristic of the object estimated based on the first estimation result and a second characteristic of the object estimated based on the second estimation result.

The processor may be further configured to obtain information about at least one from among a property, a state, a type, a component, and an appearance of the object from the first estimation result and the second estimation result, and identify the object based on the obtained information.

The first spectrometer and the second spectrometer may each include at least one from a grating and a filter array.

In accordance with an aspect of the disclosure, an operation method of an object recognition apparatus includes obtaining, by using one or more spectrometers, at least one from a first type of spectrum data and a second type of spectrum data from light scattered, emitted, or reflected from an object; obtaining image data of the object by using an image sensor; and identifying the object using at least two from among the first type of spectrum data, the second type of spectrum data, and the image data and using at least two pattern recognition algorithms.

Light of a first wavelength band and light of a second wavelength band may be irradiated to the object, and the obtaining of the first type of spectrum data or the second type of spectrum data may include obtaining the first type of spectrum data by measuring the light scattered or emitted from the object in a wavelength band different from the first wavelength band; and obtaining the second type of spectrum data by measuring light reflected from the object in the second wavelength band.

Light of a first wavelength band and light of a second wavelength band different from the first wavelength band may be irradiated to the object, and the obtaining of the first type of spectrum data or the second type of spectrum data may include obtaining the first type of spectrum data by measuring the light scattered or emitted from the object in a wavelength band different from the first wavelength band; and obtaining the second type of spectrum data by measuring the light scattered or emitted from the object in a wavelength band different from the second wavelength band.

The first type of spectrum data may include a Raman spectrum, and the second type of spectrum data may include at least one from among a visible spectrum, a fluorescence spectrum, a microwave spectrum, an infrared spectrum, and an X-ray spectrum.

The at least two pattern recognition algorithms may include a first pattern recognition algorithm that uses data obtained from one from among a first spectrometer included in the one or more spectrometers, a second spectrometer included in the one or more spectrometers, and the image sensor as input data and a second pattern recognition algorithm that uses data obtained from a different one from among first spectrometer, the second spectrometer, and the image sensor as input data, and the operation method may further include, when a first estimation result obtained by using the first pattern recognition algorithm and a second estimation result obtained by using the second pattern recognition algorithm have a same format, determining a final estimation result as a weighted sum of the first estimation result and the second estimation result.

Each of the first estimation result, the second estimation result, and the final estimation result may include a vector comprising a plurality of components, each component from the plurality of components may correspond to a probability value for classifying characteristics of the object into a plurality of predefined classes, and the determining of the weighted sum may include, for each of the first estimation result and the second estimation result, determining a difference between a highest probability value in the vector and a second-highest probability value in the vector; and applying a higher weight to the estimation result having the larger difference.

The at least two pattern recognition algorithms may include a first pattern recognition algorithm that uses data obtained from one from among a first spectrometer included in the one or more spectrometers, a second spectrometer included in the one or more spectrometers, and the image sensor as input data and a second pattern recognition algorithm that uses data obtained from a different one from among first spectrometer, the second spectrometer, and the image sensor as input data, and the operation method may further include, when a first estimation result obtained by using the first pattern recognition algorithm and a second estimation result obtained by using the second pattern recognition algorithm have different formats, identifying the object by synthesizing a first characteristic of the object estimated based on the first estimation result and a second characteristic of the object estimated based on the second estimation result.

The identifying of the object may include obtaining information about at least one from among a property, a state, a type, a component, and an appearance of the object from the first estimation result and the second estimation result; and identifying the object based on the obtained information.

In accordance with an aspect of the disclosure, an object recognition apparatus includes a first spectrometer configured to obtain a first type of spectrum data from light scattered, emitted, or reflected from an object; a second spectrometer configured to obtain a second type of spectrum data from the light scattered, emitted, or reflected from the object, the second type of spectrum data being different from the first type of spectrum data; and a processor configured to identify the object using a first pattern recognition algorithm that uses the first type of spectrum data as input data and a second pattern recognition algorithm that uses the second type of spectrum data as input data.

In accordance with an aspect of the disclosure, an object recognition apparatus comprises a spectrometer configured to obtain spectrum data from light scattered, emitted, or reflected from an object; an image sensor configured to obtain image data of the object; and a processor configured to identify the object using a first pattern recognition algorithm that uses the spectrum data as input data and a second pattern recognition algorithm that uses the image data as input data.

In accordance with an aspect of the disclosure, an object recognition apparatus includes a first sensor configured to sense first electromagnetic radiation reflected, scattered, or transmitted by an object; a second sensor configured to sense second electromagnetic radiation reflected, scattered, or transmitted by the object, the second electromagnetic radiation being different from the first electromagnetic radiation; and a processor configured to determine a property of the object based on the sensed first electromagnetic radiation and the sensed second electromagnetic radiation.

The first sensor and the second sensor may be further configured to output a first vector and a second vector, respectively, each of the first vector and the second vector including a plurality of values such that each value from among the plurality of values corresponds to a probability that the object belongs to a respective class from among a plurality of classes, and the processor may be further configured to form a final vector based on the first vector and the second vector and determine the property of the object based on the final vector.

The processor may be further configured to determine a first difference value between a highest value of the first vector and a second-highest value of the first vector; determine a second difference value between a highest value of the second vector and a second-highest value of the second vector; and form the final vector as a weighted sum of the first vector and the second vector based on the determined first difference and the determined second difference.

The processor may be further configured to assign a greater weight to the first vector based on the first difference value being greater than the second difference value.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
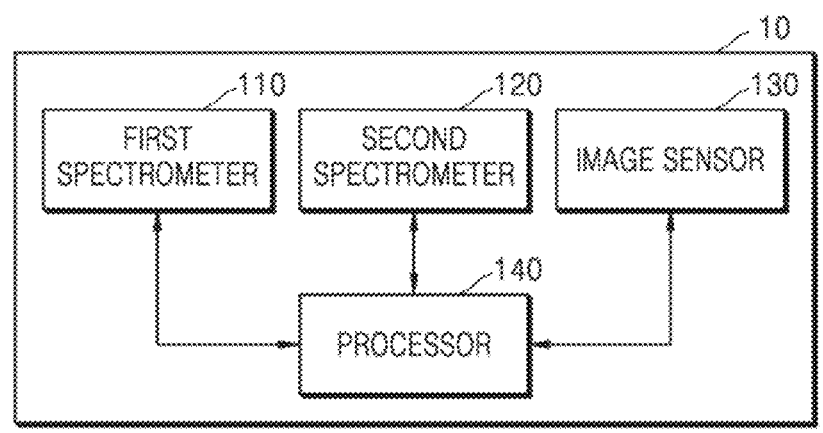
FIG. 1 is a block diagram illustrating an example of an object recognition apparatus according to an embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, embodiments are merely described below, by referring to the figures, to explain aspects. As used herein, the term "and/or" includes any and all combinations of one or more of the associated listed items. Expressions such as "at least one of", "at least one from", and "at least one from among", when preceding a list of elements, modify the entire list of elements and do not modify the individual elements of the list.

The terms used in the disclosure are selected based on general terms currently widely used in the art in consideration of functions regarding the disclosure, but the terms may vary according to the intention of those of ordinary skill in the art, precedents, or new technology in the art. Also, some terms may be arbitrarily selected by the applicant, and in this case, the meaning of the selected terms will be described in the detailed description of the disclosure. Thus, the terms used herein should not be construed based on only the names of the terms but should be construed based on the meaning of the terms together with the description throughout the disclosure.

In the following descriptions of embodiments, when a portion or element is referred to as being connected to another portion or element, the portion or element may be directly connected to the other portion or element, or may be electrically connected to the other portion or element with intervening portions or elements being therebetween. An expression used in the singular encompasses the expression of the plural, unless it has a clearly different meaning in the context. It will be further understood that the terms "comprises", "comprising", "includes", and/or "including" used herein specify the presence of stated features or elements, but do not preclude the presence or addition of one or more other features or elements.

In the following descriptions of embodiments, expressions or terms such as "constituted by," "formed by," "include," "comprise," "including," and "comprising" should not be construed as always including all specified elements, processes, or operations, but may be construed as not including some of the specified elements, processes, or operations, or further including other elements, processes, or operations.

While the terms "first", "second", etc., herein may be used to describe various elements, the elements should not be construed as being limited by these terms. These terms are used only to distinguish one element from another.

The following descriptions of embodiments should not be construed as limiting the scope of the disclosure, and modifications or changes that could be easily made from embodiments by those of ordinary skill in the art should be construed as being included in the scope of the disclosure. Hereinafter, example embodiments will be described with reference to the accompanying drawings.

FIG. 1 is a block diagram illustrating an example of an object recognition apparatus 10 according to an embodiment.

The object recognition apparatus 10 may be applicable without limitation as long as it is an apparatus that analyzes characteristics of an object or identifies the object itself. For example, the object recognition apparatus 10 may include a mobile device, a smart phone, a tablet, a personal digital assistant (PDA), a portable terminal such as a portable multimedia player (PMP), etc. but is not limited thereto. For example, the object recognition apparatus 10 may include a personal computer (PC), a smart TV, a digital broadcast receiver, a drone, a robotic device such as an advanced drivers assistance system (ADAS), a medical device, an image display device, a measurement device, an IoT device, etc., and may include at least one of various types of electronic devices. Meanwhile, the object may include a person, a thing, a terrain, a plant, and the like, and may be changed without limitation depending on a field in which the object recognition apparatus 10 is used.

Referring to FIG. 1, the object recognition apparatus 10 may include a first spectrometer 110, a second spectrometer 120, an image sensor 130 and a processor 140. However, only elements related to embodiments are illustrated in the object recognition apparatus 10 shown in FIG. 1. Therefore, it is apparent to those skilled in the art that the object recognition apparatus 10 may further include other general-purpose elements in addition to the elements shown in FIG. 1. For example, the object recognition apparatus 10 may further include a light source and a memory.

The light source may include an apparatus for irradiating light to the object. For example, the light source may irradiate a plurality of different wavelength bands of light toward the object. For example, the light source may be a laser diode that irradiates light of a short wavelength and strong intensity, or may be a light emitting diode (LED) or fluorescent lamp that irradiates broad light in a visible light band. However, the light source is not necessarily limited thereto. The light source may emit light at one or more wavelength bands suitable for analyzing the characteristics or the shape of the object.

Different light sources may be included in each of the first spectrometer 110 and the second spectrometer 120, and the same light source may be shared between the first spectrometer 110 and the second spectrometer 120. In an example, the half width (i.e., the full width at half maximum) of light irradiated by a first light source used with the first spectrometer 110 may be 1/100 or less of the center wavelength, and the half width of light irradiated by a second light source used with the second spectrometer 120 may be 1/3 or more of the central wavelength. The half width may mean a spectrum width corresponding to 1/2 of the maximum intensity in a spectrum showing the distribution of intensity according to the wavelength of light. As described above, the first spectrometer 110 and the second spectrometer 120 may obtain various types of information about the object by using light sources having different half widths.

The memory includes hardware that stores various types of data processed in the object recognition apparatus 10, and may store, for example, data processed and data to be processed in the object recognition apparatus 10. In addition, the memory may store applications, drivers, etc. that are to be driven by or that drive the object recognition apparatus 10. In an example, the memory may store pattern recognition algorithms to be described later.

The memory includes random access memory (RAM) such as dynamic random access memory (DRAM), static random access memory (SRAM), read-only memory (ROM), electrically erasable programmable read-only memory (EEPROM), CD-ROM, blue ray or other optical disk storage, hard disk drive (HDD), solid state drive (SSD), or flash memory, and further, may include other external storage devices that may be accessed by the object recognition apparatus 10.

The first spectrometer 110 may include an apparatus for obtaining a first type of spectrum data from light scattered, emitted or reflected from the object or absorbed by the object. However, the first spectrometer 110 is not necessarily limited thereto, and the first spectrometer 110 may obtain the first type of spectrum data from light transmitted or refracted through the object. In an example, when light generated by the light source or natural light is irradiated to the object, the object may absorb, scatter, emit, or reflect the light, and the first spectrometer 110 may measure spectrum data of the light absorbed, scattered, emitted, or reflected from the object. Since the spectrum data may be different depending on types of materials constituting the object, when the measured spectrum data is analyzed, the types of the materials constituting the object may be estimated.

The second spectrometer 120 may obtain a second type of spectrum data different from the first type of spectrum data from the light scattered, emitted, or reflected from the object or absorbed by the object. However, the second spectrometer 120 is not necessarily limited thereto, and the second spectrometer 120 may obtain the second type of spectrum data from the light transmitted or refracted through the object. The different types of spectrum data may mean that at least one of a wavelength band of light irradiated by the light source used to measure the spectrum data and a wavelength band where the spectrum data is measured in a spectrometer are different. In other words, the first type of spectrum data may be measured in a different wavelength band from that of the second type of spectrum data, and/or the first type of spectrum data may be generated using a light source having a wavelength band different from that of the second type of spectrum data. Each of the types of spectrum data may have a feature advantageous for analyzing a specific characteristic of the object.

According to an example, light in a first wavelength band and a second wavelength band may be irradiated to the object. When the first spectrometer 110 obtains the first type of spectrum data by measuring the light scattered or emitted from the object at a wavelength band different from the first wavelength band, the second spectrometer 120 may obtain the second type of spectrum data by measuring the light reflected from the object in the same wavelength band as the second wavelength band. In the above-described example, when the first wavelength band and the second wavelength band are the same, because the wavelength band in which the spectrum data is measured in the first spectrometer 110 and the wavelength band in which the spectrum data is measured in the second spectrometer 120 are different from each other, the spectrum data obtained by the first spectrometer 110 and the spectrum data obtained by the second spectrometer 120 have different types.

Meanwhile, in the above-described example, when the first wavelength band and the second wavelength band are different from each other, the spectrum data obtained by the first spectrometer 110 and the spectrum data obtained by the second spectrometer 120 may have different types regardless of whether the wavelength band in which the spectrum data is measured in the first spectrometer 110 and the wavelength band in which the spectrum data is measured in the second spectrometer 120 are the same as each other.

In an example, light in a first wavelength band and a second wavelength band different from the first wavelength band may be irradiated to the object. When the first spectrometer 110 obtains the first type of spectrum data by measuring the light scattered or emitted from the object at a wavelength band different from the first wavelength band, the second spectrometer 120 may obtain the second type of spectrum data by measuring the light reflected from the object at a wavelength band different from the second wavelength band. In this case, the wavelength band in which the spectrum data is measured in the first spectrometer 110 and the wavelength band in which the spectrum data is measured in the second spectrometer 120 may be the same as or different from each other.

According to an embodiment, the first type of spectrum data obtained by the first spectrometer 110 may include a Raman spectrum, and the second type of spectrum data obtained by the second spectrometer 120 may include at least one of a visible spectrum, a fluorescence spectrum, a microwave spectrum, an infrared spectrum and an X-ray spectrum. However, the present disclosure is not necessarily limited thereto. The Raman spectrum may refer to a spectrum obtained when a light of a short wavelength and strong intensity is irradiated to an object using a light source such as a laser diode and then light scattered or emitted from the object is measured at a wavelength band different from the wavelength band of the light source.

Meanwhile, in FIG. 1, only two spectrometers (that is, the first spectrometer 110 and the second spectrometer 120) are illustrated as being included in the object recognition apparatus 10, but the object recognition apparatus 10 may include more or fewer than two spectrometers. When the object recognition apparatus 10 includes more than two spectrometers, types of spectrum data obtained by the spectrometers may be different from each other based on the combination of the examples described above. In addition, the first spectrometer 110 and the second spectrometer 120 are separately expressed for convenience of description, but the first spectrometer 110 and the second spectrometer 120 are not necessarily separate apparatuses that are physically separated from each other. If even one spectrometer may be divided into functional units configured to measure different types of spectrum data, the functional units may be referred to as the first spectrometer 110 and the second spectrometer 120.

The first spectrometer 110 and the second spectrometer 120 may each obtain the first type of spectrum data and the second type of spectrum data, respectively, using at least one of a grating and a filter array. The grating may correspond to a device that performs spectroscopy using refraction, reflection, or diffraction of light, and the filter array may correspond to a device that performs spectroscopy using filters that selectively transmit or block a specific wavelength or a wavelength range.

The image sensor 130 may mean an apparatus for obtaining image data of the object. The image sensor 130 may be a photodiode array, a charge coupled device (CCD) sensor, ora complementary metal oxide semiconductor (CMOS) sensor, but is not necessarily limited thereto. The image sensor 130 may obtain an image including information about the appearance, such as the color or shape of the object. For example, the image sensor 130 may obtain an RGB image of the object.

Two or more of the first spectrometer 110, the second spectrometer 120, and the image sensor 130 may be combined to form a single detector array, but is not limited thereto. Each of the first spectrometer 110, the second spectrometer 120, and the image sensor 130 may be configured as separate detectors separated in a hardware manner.

The processor 140 serves to perform an overall function for controlling the object recognition apparatus 10. For example, the processor 140 may control operations of the first spectrometer 110, the second spectrometer 120, the image sensor 130, and the light source. Meanwhile, the processor 140 may be implemented as an array of multiple logic gates, or may be implemented as a combination of a general-purpose microprocessor and a memory in which a program that may be executed by the microprocessor is stored.

The processor 140 may identify the object using data obtained from at least two of the first spectrometer 110, the second spectrometer 120, and the image sensor 130 and at least two pattern recognition algorithms. As described above, the processor 140 does not identify the object using only a specific type of spectrum data or image data; instead, the processor 140 identifies the object by comprehensively considering various types of spectrum data and image data, thereby increasing the accuracy of object recognition. Hereinafter, a process in which the object recognition apparatus 10 operates will be described in more detail with reference to FIG. 2.

Figure 2:
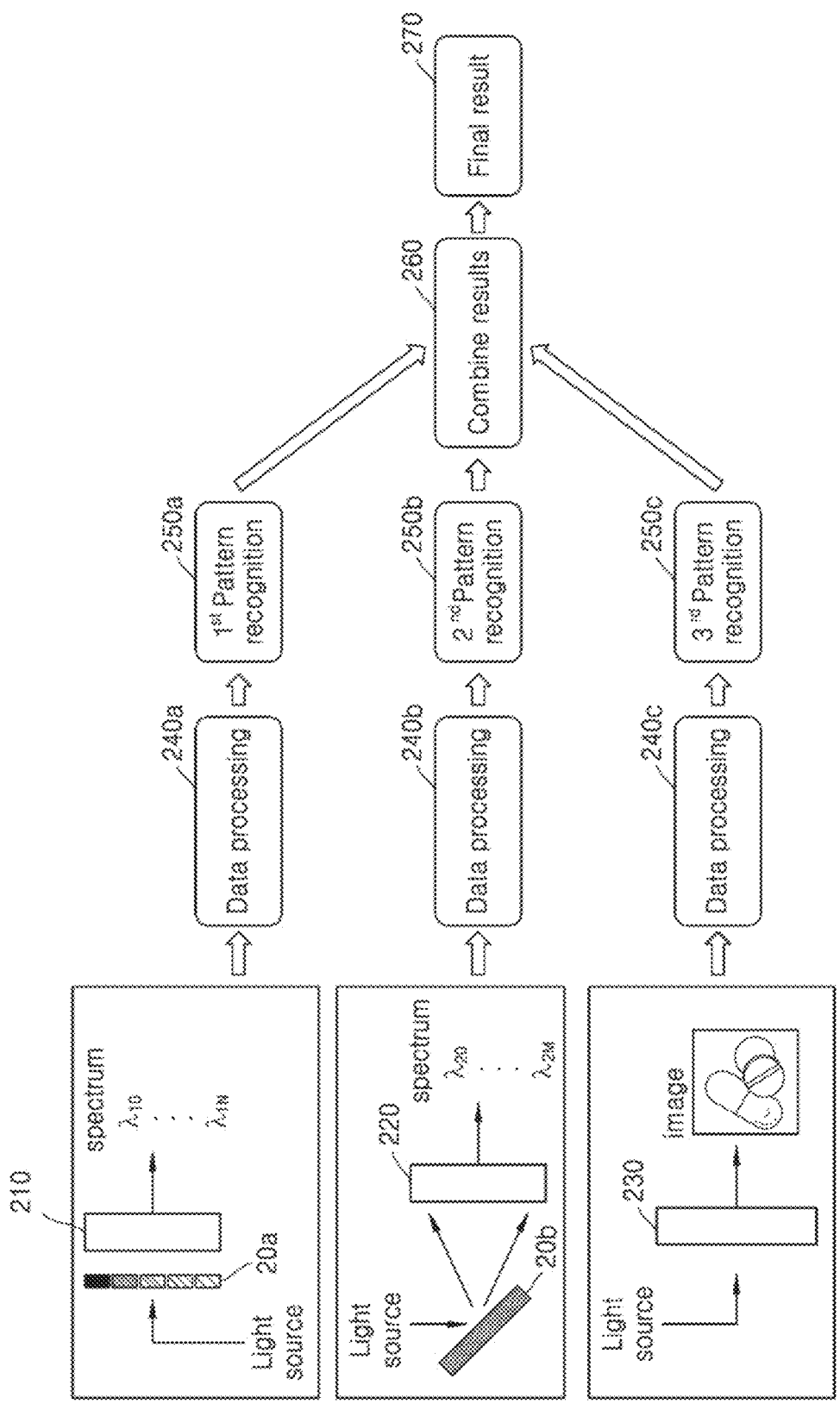
FIG. 2 is a schematic diagram illustrating an overall operation process of an object recognition apparatus according to an embodiment.

FIG. 2 is a schematic diagram illustrating an overall process in which an object recognition apparatus operates according to an embodiment.

Referring to FIG. 2, the operation process of the object recognition apparatus including a first spectrometer 210, a second spectrometer 220 and an image sensor 230 is illustrated as an example. The first spectrometer 210, the second spectrometer 220, and the image sensor 230 respectively correspond to the first spectrometer 110, the second spectrometer 120, and the image sensor 130 of FIG. 1, and thus redundant descriptions are omitted. In an example, the first spectrometer 210 may obtain a first type of spectrum data of an object using a filter array 20a, the second spectrometer 220 may obtain a second type of spectrum data of the object using a grating 20b, and the image sensor 230 may obtain image data of the object. However, this is only an example, and is not intended to limit embodiments according to the disclosure.

The first type of spectrum data obtained by the first spectrometer 210 may include information about the intensity of light at N+1 wavelengths ($\lambda_{10}, \ldots, \lambda_{1N}$), and the second type of spectrum data obtained by the second spectrometer 220 may include information about the intensity of the light at M+1 wavelengths ($\lambda_{20}, \ldots, \lambda_{2M}$). In addition, the image data obtained by the image sensor 230 may include information about the appearance of the object. In operations 240a, 240b, and 240c, the object recognition apparatus may perform data processing on each of the first type of spectrum data, the second type of spectrum data, and the image data respectively. Data processing may mean modifying data in the form suitable for inputting the data to a pattern recognition algorithm.

Thereafter, the first type of spectrum data may be input to a first pattern recognition algorithm 250a, and the first pattern recognition algorithm 250a may output an estimation result corresponding to the first type of spectrum data. Further, the second type of spectrum data may be input to a second pattern recognition algorithm 250b, and the second pattern recognition algorithm 250b may output an estimation result corresponding to the second type of spectrum data. Finally, the image data may be input to a third pattern recognition algorithm 250c, and the third pattern recognition algorithm 250c may output an estimation result corresponding to the image data. The estimation results may include results of estimating the characteristics of the object.

Each of the first pattern recognition algorithm 250a, the second pattern recognition algorithm 250b, and the third pattern recognition algorithm 250c may be an algorithm that outputs an estimation result corresponding to input data through pattern recognition with respect to the input data without limitation. For example, the pattern recognition algorithm may correspond to a classification algorithm, a clustering algorithm, an Ensemble learning algorithm, a general algorithm for predicting arbitrary structured labels, a regression algorithm, etc.

For example, classification algorithms may include Linear SVC, Naïve Bayes Classifier, KNeighbors Classifier, Ensemble Classifiers, SGD Classifier, kernel approximation, neural network, SVM, decision trees, logistic regression, etc., and clustering algorithms may include spectral clustering, Kmeans clustering, MiniBatch Kmeans clustering, etc. In addition, ensemble learning algorithms may include boosting (meta-algorithm), bootstrap aggregating ("bagging"), Ensemble averaging, etc., and general algorithms for predicting arbitrary structured labels may include Bayesian networks and Markov random fields, and regression algorithms may include Gaussian process regression (kriging), linear regression and extensions, Neural networks and deep learning methods, independent component analysis (ICA), principal components analysis (PCA), etc.

Meanwhile, the neural network may be a deep neural network (DNN) or n-layers neural networks including one or more hidden layers. The DNN may include, but is not limited to, Convolutional Neural Networks (CNN), Recurrent Neural Networks (RNN), Deep Belief Networks, Restricted Boltzman Machines, etc. When the pattern recognition algorithm is the neural network, the estimation result of the pattern recognition algorithm may correspond to an inference result of the neural network.

In an example, each of the first pattern recognition algorithm 250a, the second pattern recognition algorithm 250b, and the third pattern recognition algorithm 250c may be a neural network trained to predict a class to which input data belongs among a plurality of predefined classes in relation to the characteristics of the object. For example, each of the first pattern recognition algorithm 250a, the second pattern recognition algorithm 250b, and the third pattern recognition algorithm 250c that are previously trained may perform feature extraction, pattern recognition, etc. on the input data. Meanwhile, because types of data input to each of the first pattern recognition algorithm 250a, the second pattern recognition algorithm 250b, and the third pattern recognition algorithm 250c are different from each other, the first pattern recognition algorithm 250a, the second pattern recognition algorithm 250b, and the third pattern recognition algorithm 250c may be individually trained by different training data sets. However, the first pattern recognition algorithm 250a, the second pattern recognition algorithm 250b, and the third pattern recognition algorithm 250c are not necessarily limited thereto.

In operation 260, the object recognition apparatus may combine at least two of the estimation results output from the first pattern recognition algorithm 250a, the second pattern recognition algorithm 250b, and the third pattern recognition algorithm 250c. In operation 270, the object recognition apparatus may output a final result related to object recognition based on a combination of the estimation results. Hereinafter, with reference to FIGS. 3 to 5, an effect obtained when the object recognition apparatus according to the disclosure performs object recognition by combining estimation results estimated from various types of spectrum data and image data will be described in detail.

Figure 3:
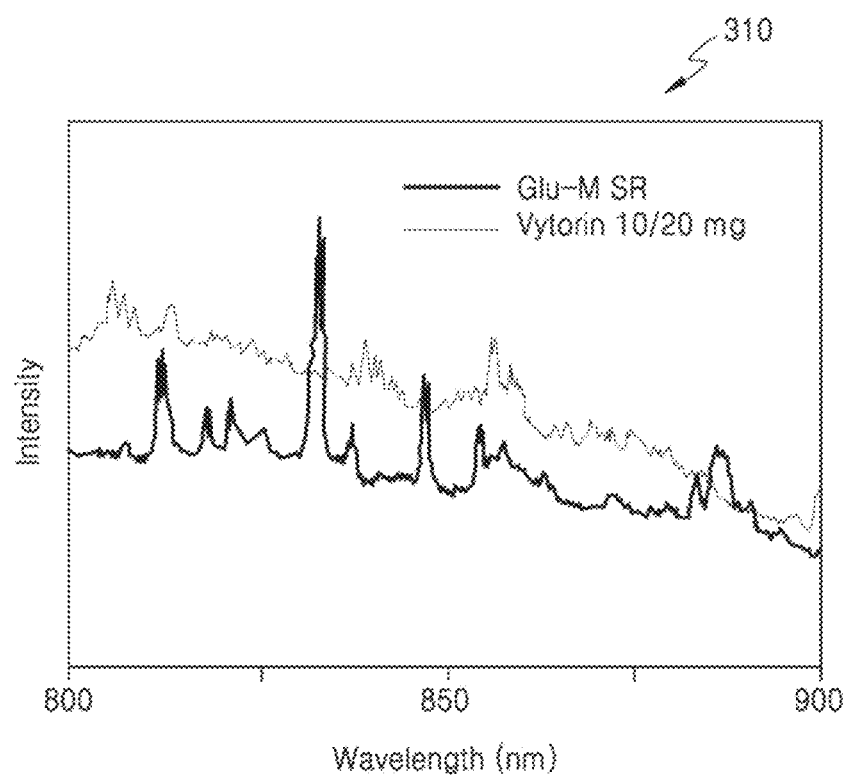
FIGS. 3 to 5 are diagrams showing examples of spectrum data obtained with respect to various objects.
Figure 4:
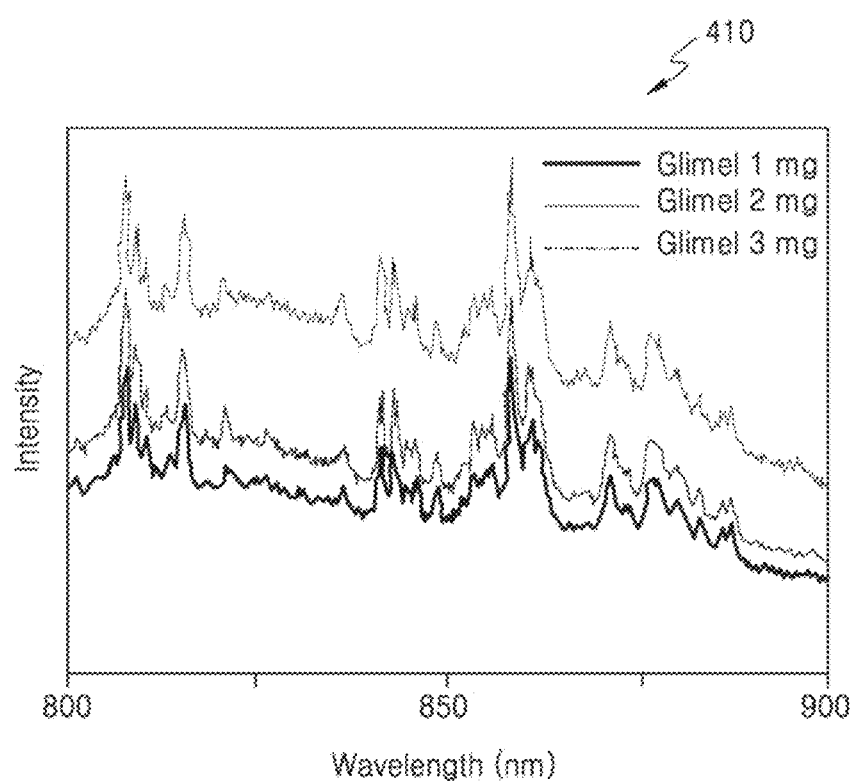
Figure 5:
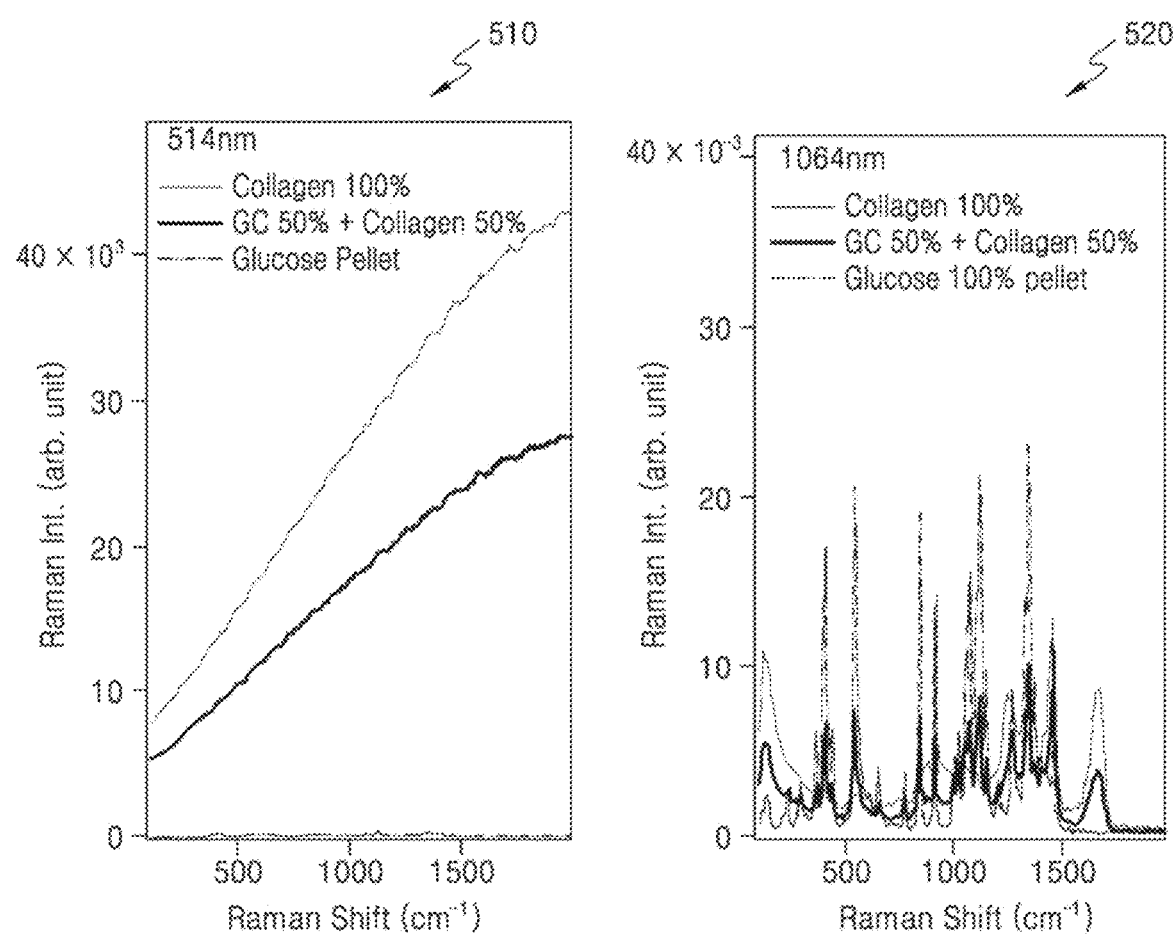

FIGS. 3 to 5 are diagrams showing examples of spectrum data obtained with respect to objects.

FIG. 3 shows spectrum data obtained when objects are medication pill GluM SR and medication pill Vytorin 10/20 mg. A Raman spectrum 310 obtained with respect to GluM SR and Vytorin 10/20 mg is shown. The Raman spectrum 310 of FIG. 3 includes spectrum data obtained when measuring light at a wavelength band of 750 nm to 900 nm after irradiating light of 740 nm using a laser diode to each of GluM SR and Vytorin 10/20 mg.

Referring to FIG. 3, it may be seen that because GluM SR and Vytorin 10/20 mg include different components, the spectrum data have different forms. Therefore, when pattern recognition is performed based on the spectrum data obtained with respect to each of GluM SR and Vytorin 10/20 mg, it is possible to distinguish between GluM SR and Vytorin 10/20 mg. However, it is not always possible to distinguish different objects using only the Raman spectrum 310 as described above.

Objects including the same component but differences in appearance may be difficult to be clearly distinguished using only a specific type of spectrum data. For example, referring to FIG. 4, when objects are medication pill Glimel 1 mg, medication pill Glimel 2 mg, and medication pill Glimel 3 mg, a Raman spectrum 410 obtained with respect to Glimel 1 mg, Glimel 2 mg and Glimel 3 mg is shown. It may be seen that because Glimel 1 mg, Glimel 2 mg, and Glimel 3 mg include the same component, spectrum data may have almost the same form. Therefore, when using only the Raman spectrum 410, it may be difficult to distinguish each of Glimel 1 mg, Glimel 2 mg, and Glimel 3 mg from each other.

However, because Glimel 1 mg, Glimel 2 mg and Glimel 3 mg have different colors and sizes, when RGB image data or visible spectrum data including information about the appearance of Glimel 1 mg, Glimel 2 mg and Glimel 3 mg is additionally obtained, it may be possible to distinguish each of Glimel 1 mg, Glimel 2 mg and Glimel 3 mg.

The Raman spectrum 410 may be spectrum data obtained when light is measured at a wavelength of 750 nm to 900 nm after light of 740 nm is irradiated to the object using a laser diode, and the RGB image data or the visible spectrum data may be data obtained when light is measured in the same wavelength band (e.g., 400 nm to 700 nm) as a light source after light of a visible light band (e.g., 400 nm to 700 nm) is irradiated to the object using a broad spectrum light source such as an LED, natural light, or fluorescent lamp, etc.

Referring to FIG. 5, when objects are a substance including glucose as a single component, a substance including collagen as a single component, and a composition including 50% glucose and 50% collagen, a fluorescence spectrum 510 and a Raman spectrum 520 obtained with respect to the objects are shown. The fluorescence spectrum 510 may refer to spectrum data obtained when light is measured at a wavelength band of 520 nm to 820 nm after light of 514 nm is irradiated to the object using a laser diode, and the Raman spectrum 520 may refer to spectrum data obtained when light is measured at a wavelength band of 1070 nm to 1370 nm after light of 1064 nm is irradiated to the object using a laser diode.

Considering the form of the spectrum data shown in FIG. 5, it may be seen that glucose is dominant in the Raman spectrum 520 and collagen is dominant in the fluorescence spectrum 510. Therefore, both the fluorescence spectrum 510 and the Raman spectrum 520 need to be used to confirm the presence of each component in a composition that includes both components, or to perform content analysis. This is because it is difficult to confirm the presence of glucose in a substance including collagen as a main component and only a small amount of glucose by using the fluorescence spectrum 510, and it is possible to confirm the presence of glucose only by using the Raman spectrum 520. In addition, it is difficult to confirm the presence of collagen in a substance including glucose as a main component and only a small amount of collagen by using the Raman spectrum 520, and it is possible to confirm the presence of collagen only by using the fluorescence spectrum 510.

Meanwhile, the face recognition technology according to the related art is performed by obtaining the appearance of an object as an RGB image and applying pattern recognition to the obtained RGB image. Therefore, if it is possible to manufacture a mannequin having the same appearance as the object, face recognition may be performed even if the object is not an actual object, and thus a security issue may occur. The above-described problem may be solved by using spectrum data capable of identifying a type, a component of the object, etc. in addition to the RGB image.

As described above, when the object recognition apparatus performs object recognition by combining estimation results estimated from various types of spectrum data and image data as well as a specific type of spectrum data or image data, not only the accuracy of object recognition may increase but also additional effects, such as enhanced security, may be obtained.

Returning to FIG. 2 again, the processor 140 may obtain a final estimation result by combining the estimation results of the first pattern recognition algorithm 250a that uses the first type of spectrum data obtained from the first spectrometer 110 as an input, the second pattern recognition algorithm 250b that uses the second type of spectrum data obtained from the second spectrometer 120 as an input, and the third pattern recognition algorithm 250c that uses the image data obtained from the image sensor 130 as an input. Meanwhile, a method in which the processor 140 combines at least two of the estimation results output from the pattern recognition algorithms 250a, 250b, and 250c may vary according to the format of the estimation results output from the pattern recognition algorithms.

According to an embodiment, when an estimation result of one pattern recognition algorithm that uses data obtained from one of the first spectrometer 110, the second spectrometer 120, and the image sensor 130 as the input and an estimation result of another pattern recognition algorithm that uses data obtained from another one of the first spectrometer 110, the second spectrometer 120, and the image sensor 130 as the input have the same format, the processor 140 may determine a weighted sum of the estimation result of the one pattern recognition algorithm and the estimation result of the other pattern recognition algorithm as the final estimation result. The estimation results may be in the same format when types of the characteristics of the object estimated from the estimation results of the pattern recognition algorithms are the same, and the number and types of options for selecting the characteristics of the objects are the same. Hereinafter, when the estimation result of the first pattern recognition algorithm and the estimation result of the second pattern recognition algorithm have the same format, a process of determining the final estimation result will be described in more detail with reference to FIG. 6.

Figure 6:
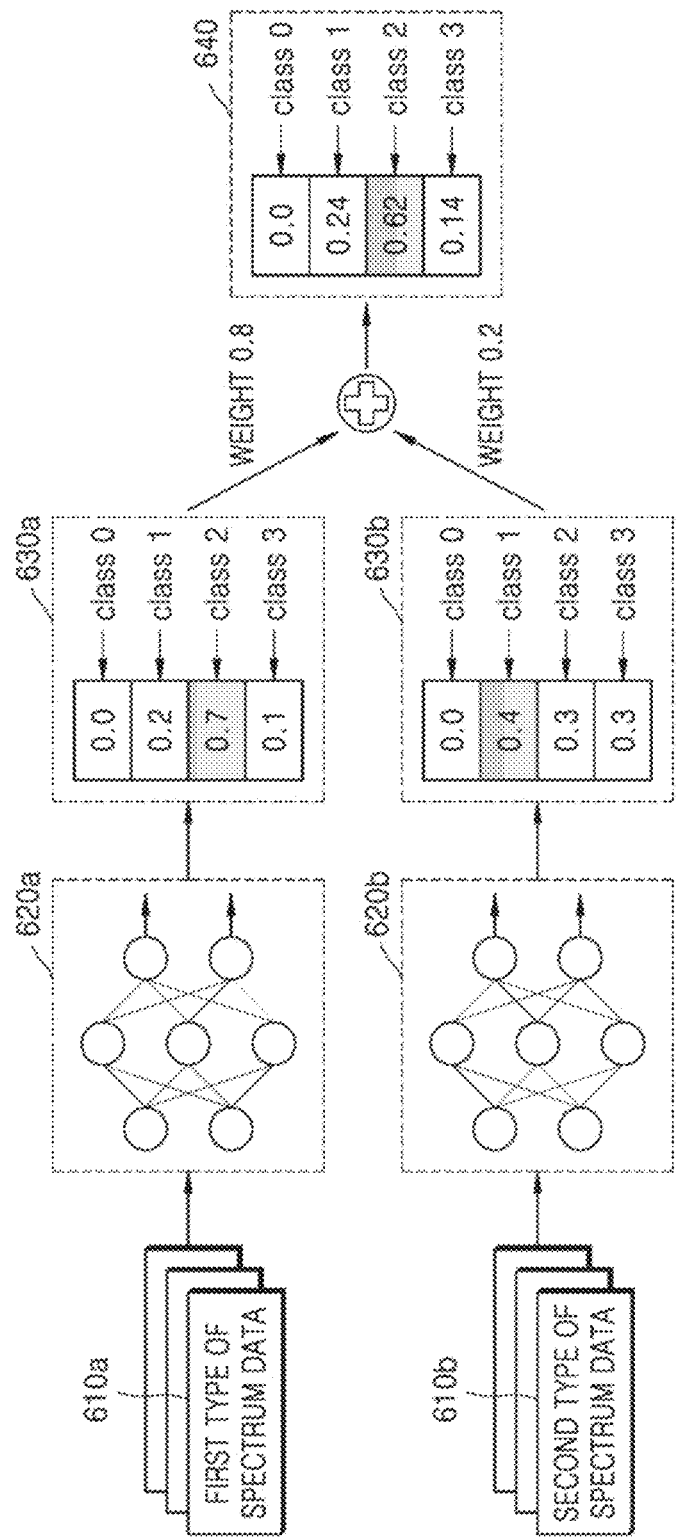
FIG. 6 is a diagram illustrating an example of a method of obtaining a final estimation result by combining estimation results obtained by using a plurality of pattern recognition algorithms according to an embodiment.

FIG. 6 is a diagram illustrating an example of a method of obtaining a final estimation result by combining estimation results of a plurality of pattern recognition algorithms according to some embodiments.

Referring to FIG. 6, in the example in which a pattern recognition algorithm is a neural network, as a first type of spectrum data 610a is input to a first neural network 620a, a first inference result 630a (i.e., a first vector) is output, and as a second type of spectrum data 610b is input to a second neural network 620b, a second inference result 630b (i.e., second vector) is output.

Each of the first inference result 630a of the first neural network 620a and the second inference result 630b of the second neural network 620b may correspond to a vector including a probability value in which the characteristics of an object are classified into a plurality of predefined classes as each component. For example, when the characteristic of the object is the type of the object, class 0 may represent a person, class 1 may be a puppy, class 2 may be a cat, and class 3 may be a bird, and each of the first inference result 630a of the first neural network 620a and the second inference result 630b of the second neural network 620b may include the probability value in which the type of the object is classified into each class. In other words, the inference result may be a vector in which each number of the vector represents a probability that the object belongs to a particular class. As described above, when the characteristics of the object estimated from the first inference result 630a of the first neural network 620a and the second inference result 630b of the second neural network 620b are the same, and options (class 0 to class 3) for selecting the characteristics of the object are the same, the format of inference results may be the same.

As shown in FIG. 6, for example, the first inference result 630a of the first neural network 620a includes information that the probability that the characteristic of the object corresponds to class 0 is 0, the probability that the characteristic of the object corresponds to class 1 is 0.2, the probability that the characteristic of the object corresponds to class 2 is 0.7, and the probability that the probability that the characteristic of the object corresponds to class 3 is 0.1. Meanwhile, the second inference result 630b of the second neural network 620b includes information that the probability that the characteristic of the object corresponds to class 0 is 0, the probability that the characteristic of the object corresponds to class 1 is 0.4, the probability that the characteristic of the object corresponds to class 2 is 0.3 and the probability that the characteristic of the object corresponds to class 3 is 0.3.

In the first inference result 630a of the first neural network 620a, the highest probability value is 0.7, and the second highest probability value is 0.2, and the difference between the highest probability value and the second highest probability value is 0.5 which is relatively large. Therefore, according to the first interference result 630a of the first neural network 620a, strong estimation of which class the object belongs to is possible. In contrast, in the second inference result 630b of the second neural network 620b, the highest probability value is 0.4, the second highest probability value is 0.3, and the difference between the highest probability value and the second highest probability value is 0.1 which is quite small. Therefore, according to the second interference result 630b of the second neural network 620b, it is difficult to make a strong estimate of which class the object belongs to.

Therefore, in order to perform high-precision estimation while considering both the first interference result 630a of the first neural network 620a and the second interference result 630b of the second neural network 620b, a higher weight needs to be applied to the first inference result 630a of the first neural network 620a than to the second inference result 630b of the second neural network 620b. For example, a weight of 0.8 may be applied to the first inference result 630a of the first neural network 620a, and a weight of 0.2 may be applied to the second inference result 630b of the second neural network 620b as shown in FIG. 6.

The weighted sum of the first inference result 630a of the first neural network 620a and the second inference result 630b of the second neural network 620b may be calculated, and the calculated weighted sum may be determined as a final inference result 640 (i.e., a final vector). According to the final inference result 640, the probability that the characteristic of the object corresponds to class 2 is 0.62 which is the highest, and thus the characteristic of the object may be estimated to correspond to class 2.

Meanwhile, FIG. 6 illustrates an example of combining inference results output from two neural networks for convenience of description, but this is only an example. Those skilled in the art will easily understand that types of data used to identify the object may be more than two, and in this case, inference results output from more than two neural networks may be combined.

Referring back to FIG. 1, as described with reference to FIG. 6, when a vector including a probability value in which the characteristics of an object are classified into a plurality of predefined classes as each component is output as the estimation result of each of the first pattern recognition algorithm and the second pattern recognition algorithm, the processor 140 may apply a higher weight to the estimation result in which the difference between the highest probability value and the second highest probability value is greater among the estimation result of the first pattern recognition algorithm and the estimation result of the second pattern recognition algorithm. In other words, for each of the first estimation result and the second estimation result, a difference may be determined between a highest probability value in the respective vector and a second-highest probability value in the respective vector, and a higher weight may be applied to the estimation result having the larger difference in the calculation of the final estimation result.

According to an embodiment, when an estimation result of a first pattern recognition algorithm that uses data obtained from one of the first spectrometer 110, the second spectrometer 120, and the image sensor 130 as the input and an estimation result of a second pattern recognition algorithm that uses data obtained from the other one of the first spectrometer 110, the second spectrometer 120, and the image sensor 130 as the input have different formats, the processor 140 may identify the object by synthesizing a first characteristic of the object estimated from the estimation result of the first pattern recognition algorithm and a second characteristic of the object estimated from the estimation result of the second pattern recognition algorithm.

For example, the first pattern recognition algorithm may estimate a type and component of the object and the second pattern recognition algorithm may estimate a color, shape, etc. of the object. In this case, the processor 140 may estimate the type and component of the object from the estimation result of the first pattern recognition algorithm, and may estimate the color, shape, etc. of the object from the estimation result of the second pattern recognition algorithm. Thereafter, the processor 140 may identify the object by combining all of the estimated information. The processor 140 may obtain information about at least one of a property, state, type, component, and appearance of the object from estimation results obtained from at least two pattern recognition algorithms, and identify the object based on the obtained information. Therefore, it is possible to recognize an object with higher accuracy than using only a specific type of spectrum data or image data or using a single pattern recognition algorithm.

Figure 7:
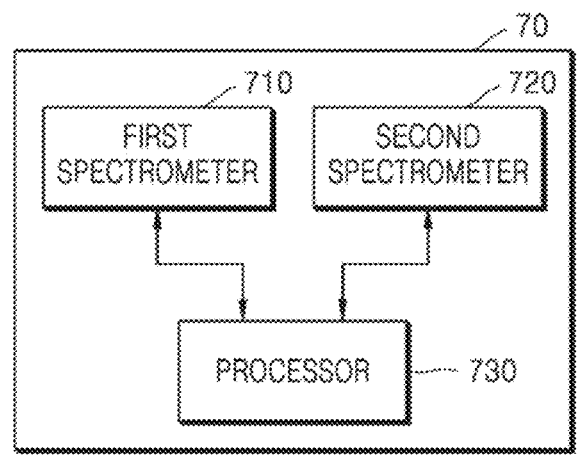
FIG. 7 is a block diagram illustrating an example of an object recognition apparatus according to an embodiment.

FIG. 7 is a block diagram illustrating an example of an object recognition apparatus 70 according to an embodiment.

Referring to FIG. 7, the object recognition apparatus 70 may include a first spectrometer 710, a second spectrometer 720 and a processor 730. The first spectrometer 710, the second spectrometer 720, and the processor 730 of FIG. 7 respectively correspond to the first spectrometer 110, the second spectrometer 120, and the processor 140 of FIG. 1, and thus descriptions thereof are omitted. An overall operation process of the object recognition apparatus 70 of FIG. 7 may be similar to that of the object recognition apparatus 10 of FIG. 1, except that the object recognition apparatus 70 is merely different from the object recognition apparatus 10 in that the object recognition apparatus 70 does not include the image sensor 130.

For example, the first spectrometer 710 may obtain a first type of spectrum data from light scattered, emitted, or reflected from an object, and the second spectrometer 720 may obtain a second type of spectrum data different from the first type of spectrum data from the light scattered, emitted, or reflected from the object. The processor 730 may identify the object using a first pattern recognition algorithm that uses the first type of spectrum data as an input and a second pattern recognition algorithm that uses the second type of spectrum data as the input.

Meanwhile, only the elements related to the present embodiments are illustrated in the object recognition apparatus 70 illustrated in FIG. 7. Therefore, it is apparent to those skilled in the art that the object recognition apparatus 70 may further include other general-purpose elements in addition to the elements shown in FIG. 7.

Figure 8:
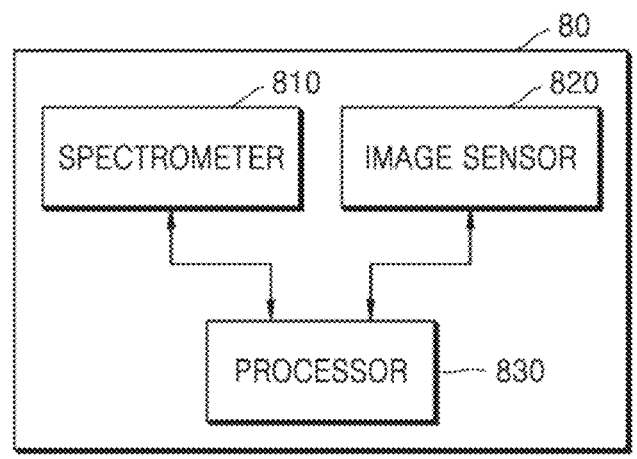
FIG. 8 is a block diagram illustrating an example of an object recognition apparatus according to an embodiment.

FIG. 8 is a block diagram illustrating an example of an object recognition apparatus 80 according to an embodiment.

Referring to FIG. 8, the object recognition apparatus 80 may include a spectrometer 810, an image sensor 820 and a processor 830. The spectrometer 810 of FIG. 8 corresponds to the first spectrometer 110 or the second spectrometer 120 of FIG. 1, and the image sensor 820 and the processor 830 of FIG. 8 respectively correspond to the image sensor 130 and the processor 140 of FIG. 1, and thus descriptions thereof are omitted. An overall operation process of the object recognition apparatus 80 of FIG. 8 may be similar to that of the object recognition apparatus 10 of FIG. 1, except that the object recognition apparatus 80 is merely different from the object recognition apparatus 10 in that the object recognition apparatus 80 does not include a plurality of spectrometers. Instead, a single spectrometer 810 and an image sensor 820 are included.

For example, the spectrometer 810 may obtain spectrum data from light scattered, emitted, or reflected from an object, and the image sensor 820 may obtain image data about the object. The processor 830 may identify the object using a first pattern recognition algorithm that uses the spectrum data as an input and a second pattern recognition algorithm that uses the image data as the input.

Meanwhile, only the elements related to the present embodiments are illustrated in the object recognition apparatus 80 illustrated in FIG. 8. Therefore, it is apparent to those skilled in the art that the object recognition apparatus 80 may further include other general-purpose elements in addition to the elements shown in FIG. 8.

Figure 9:
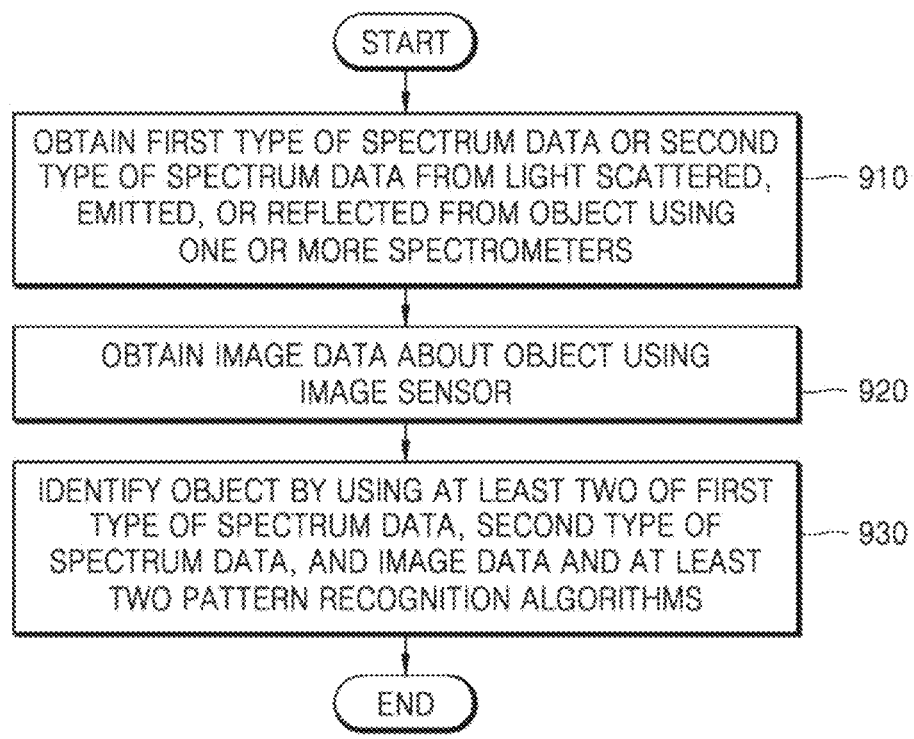
FIG. 9 is a flowchart illustrating an operation method of an object recognition apparatus according to an embodiment.

FIG. 9 is a flowchart illustrating an operation method of an object recognition apparatus according to an embodiment.

Referring to FIG. 9, the operation method of the object recognition apparatus includes operations that are time-serially processed by the object recognition apparatus 10 illustrated in FIG. 1. Therefore, it may be seen that the descriptions given above with respect to FIGS. 1 to 6 are also applied to the operation method of the object recognition apparatus of FIG. 9 even though omitted below.

In operation 910, the object recognition apparatus may obtain a first type of spectrum data or a second type of spectrum data from light scattered, emitted, or reflected from an object using one or more spectrometers. The one or more spectrometers may obtain the first type of spectrum data or the second type of spectrum data using at least one of a grating and a filter array.

In an example, light of a first wavelength band and light of a second wavelength band may be irradiated to the object, and the object recognition apparatus may obtain the first type of spectrum data by measuring light scattered or emitted from the object at a wavelength band different from the first wavelength band. The object recognition apparatus may obtain the second type of spectrum data by measuring light reflected from the object at the second wavelength band.

In an example, light of a first wavelength band and light of a second wavelength band may be irradiated to the object, and the object recognition apparatus may obtain the first type of spectrum data by measuring light scattered or emitted from the object at the wavelength band different from the first wavelength band. The object recognition apparatus may obtain the second type of spectrum data by measuring light scattered or emitted from the object at a wavelength band different from the second wavelength band.

For example, the first type of spectrum data may include a Raman spectrum, and the second type of spectrum data may include at least one of a visible spectrum, a fluorescence spectrum, a microwave spectrum, an infrared spectrum, and an X-ray spectrum. However, the first type of spectrum data and the second type of spectrum data are not necessarily limited thereto.

In operation 920, the object recognition apparatus may obtain image data about the object using an image sensor. The image sensor may be a photodiode array, a CCD sensor, or a CMOS sensor, but is not limited thereto. The object recognition apparatus may obtain an image including information about the appearance, such as the color or the shape of the object, using the image sensor.

In operation 930, the object recognition apparatus may identify the object by using at least two of the first type of spectrum data, the second type of spectrum data, and the image data and at least two pattern recognition algorithms. As described above, the object recognition apparatus does not identify the object using only a single type of spectrum data or only image data, but instead identifies the object by comprehensively considering various types of spectrum data and image data, and thus the accuracy of object recognition may increase.

When an estimation result of a first pattern recognition algorithm that uses one of the first type of spectrum data, the second type of spectrum data, and the image data as an input and an estimation result of a second pattern recognition algorithm that uses the other one of the first type of spectrum data, the second type of spectrum data, and the image data as the input have the same format, the object recognition apparatus may determine a weighted sum of the estimation result of the first pattern recognition algorithm and the estimation result of the second pattern recognition algorithm as a final estimation result.

For example, when the estimation result of each of the first pattern recognition algorithm and the second pattern recognition algorithm includes a vector including probability values in which the characteristics of an object are classified into a plurality of predefined classes, the object recognition apparatus may apply a higher weight to the estimation result in which the difference between the highest probability value and the second highest probability value is greater among the estimation result of the first pattern recognition algorithm and the estimation result of the second pattern recognition algorithm.

Meanwhile, when the estimation result of the first pattern recognition algorithm that uses one of the first type of spectrum data, the second type of spectrum data, and the image data as the input and the estimation result of the second pattern recognition algorithm that uses the other one of the first type of spectrum data, the second type of spectrum data, and the image data as the input have different formats, the object recognition apparatus may identify the object by synthesizing a first characteristic of the object estimated from the estimation result of the first pattern recognition algorithm and a second characteristic of the object estimated from the estimation result of the second pattern recognition algorithm.

The object recognition apparatus may obtain information about at least one of a property, state, type, component, and appearance of the object from estimation results obtained from at least two pattern recognition algorithms, and identify the object based on the obtained information. As described above, the object recognition apparatus may identify the object with high accuracy by using various types of spectrum data and image data together and combining estimation results output from a plurality of pattern recognition algorithms.

The operation method of the object recognition apparatus may be recorded in a computer-readable recording medium having recorded one or more programs including instructions for executing the method. Examples of the computer-readable recording medium include magnetic media such as a hard disk, a floppy disk and magnetic tape, optical media such as CD-ROM and DVD, magneto-optical media such as a floptical disk, and hardware devices specifically configured to store and execute program instructions, for example, ROM, RAM, and a flash memory. Examples of program instructions include machine language code such as those generated by a compiler, as well as high-level language code that may be executed by a computer by using an interpreter or the like.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An object recognition apparatus comprising:
a first spectrometer configured to obtain a first type of spectrum data from light scattered, emitted, or reflected from an object;
a second spectrometer configured to obtain a second type of spectrum data from the light scattered, emitted, or reflected from the object, the second type of spectrum data being different from the first type of spectrum data;
an image sensor configured to obtain image data of the object; and
a processor configured to identify the object using data obtained from at least two from among the first spectrometer, the second spectrometer, and the image sensor and using at least two pattern recognition algorithms,
wherein the at least two pattern recognition algorithms comprise a first pattern recognition algorithm that uses data obtained from one from among the first spectrometer, the second spectrometer, and the image sensor as input data and a second pattern recognition algorithm that uses data obtained from a different one from among the first spectrometer, the second spectrometer, and the image sensor as input data, and
wherein the processor is further configured to, when a first estimation result obtained by using the first pattern recognition algorithm and a second estimation result obtained by using the second pattern recognition algorithm have a same format, determine a final estimation result as a weighted sum of the first estimation result and the second estimation result.

2. The object recognition apparatus of claim 1,
wherein light of a first wavelength band and light of a second wavelength band are irradiated to the object, wherein the first spectrometer is configured to obtain the first type of spectrum data by measuring the light scattered or emitted from the object in a wavelength band different from the first wavelength band, and wherein the second spectrometer is configured to obtain the second type of spectrum data by measuring the light reflected from the object in the second wavelength band.

3. The object recognition apparatus of claim 1, wherein light of a first wavelength band and light of a second wavelength band different from the first wavelength band are irradiated to the object, wherein the first spectrometer is configured to obtain the first type of spectrum data by measuring the light scattered or emitted from the object in a wavelength band different from the first wavelength band, and wherein the second spectrometer is configured to obtain the second type of spectrum data by measuring the light scattered or emitted from the object in a wavelength band different from the second wavelength band.

4. The object recognition apparatus of claim 1, wherein the first type of spectrum data comprises a Raman spectrum, and wherein the second type of spectrum data comprises at least one from among a visible spectrum, a fluorescence spectrum, a microwave spectrum, an infrared spectrum, and an X-ray spectrum.

5. The object recognition apparatus of claim 1, further comprising:

a first light source used together with the first spectrometer to obtain the first type of spectrum data; and a second light source used together with the second spectrometer to obtain the second type of spectrum data, wherein a full width at half maximum of light irradiated by the first light source is $1/100$ or less of a center wavelength of the first light source, and wherein a full width at half maximum of light irradiated by the second light source is $1/3$ or more of a center wavelength of the second light source.

6. The object recognition apparatus of claim 1, wherein each of the first estimation result, the second estimation result, and the final estimation result comprises a vector comprising a plurality of components, wherein each component from the plurality of components corresponds to a probability value for classifying characteristics of the object into a plurality of predefined classes, and wherein the processor is further configured to:

for each of the first estimation result and the second estimation result, determine a difference between a highest probability value in the vector and a second-highest probability value in the vector; and apply a higher weight to the estimation result having the larger difference.

7. The object recognition apparatus of claim 1, wherein the processor is further configured to, when the first estimation result obtained by using the first pattern recognition algorithm and the second estimation result obtained by using the second pattern recognition algorithm have different formats, identify the object by synthesizing a first characteristic of the object estimated based on the first estimation result and a second characteristic of the object estimated based on the second estimation result.

8. The object recognition apparatus of claim 1, wherein the processor is further configured to obtain information about at least one from among a property, a state, a type, a component, and an appearance of the object from the first estimation result and the second estimation result, and identify the object based on the obtained information.

9. The object recognition apparatus of claim 1, wherein the first spectrometer and the second spectrometer each comprise at least one from a grating and a filter array.

10. An operation method of an object recognition apparatus, the operation method comprising:

obtaining, by using one or more spectrometers, at least one from a first type of spectrum data and a second type of spectrum data from light scattered, emitted, or reflected from an object;

obtaining image data of the object by using an image sensor; and identifying the object using at least two from among the first type of spectrum data, the second type of spectrum data, and the image data and using at least two pattern recognition algorithms, wherein the at least two pattern recognition algorithms comprise a first pattern recognition algorithm that uses data obtained from one from among a first spectrometer included in the one or more spectrometers, a second spectrometer included in the one or more spectrometers, and the image sensor as input data and a second pattern recognition algorithm that uses data obtained from a different one from among the first spectrometer, the second spectrometer, and the image sensor as input data, and wherein the operation method further comprises, when a first estimation result obtained by using the first pattern recognition algorithm and a second estimation result obtained by using the second pattern recognition algorithm have a same format, determining a final estimation result as a weighted sum of the first estimation result and the second estimation result.

11. The operation method of claim 10, wherein light of a first wavelength band and light of a second wavelength band are irradiated to the object, and wherein the obtaining of the first type of spectrum data or the second type of spectrum data comprises:

obtaining the first type of spectrum data by measuring the light scattered or emitted from the object in a wavelength band different from the first wavelength band; and obtaining the second type of spectrum data by measuring light reflected from the object in the second wavelength band.

12. The operation method of claim 10, wherein light of a first wavelength band and light of a second wavelength band different from the first wavelength band are irradiated to the object, and wherein the obtaining of the first type of spectrum data or the second type of spectrum data comprises:

obtaining the first type of spectrum data by measuring the light scattered or emitted from the object in a wavelength band different from the first wavelength band; and obtaining the second type of spectrum data by measuring the light scattered or emitted from the object in a wavelength band different from the second wavelength band.

13. The operation method of claim 10, wherein the first type of spectrum data comprises a Raman spectrum, and wherein the second type of spectrum data comprises at least one from among a visible spectrum, a fluorescence spectrum, a microwave spectrum, an infrared spectrum, and an X-ray spectrum.

14. The operation method of claim 10, wherein each of the first estimation result, the second estimation result, and the final estimation result comprises a vector comprising a plurality of components, wherein each component from the plurality of components corresponds to a probability value for classifying characteristics of the object into a plurality of predefined classes, and wherein the determining of the weighted sum comprises:

for each of the first estimation result and the second estimation result, determining a difference between a highest probability value in the vector and a second-highest probability value in the vector; and applying a higher weight to the estimation result having the larger difference.

15. The operation method of claim 10, wherein the operation method further comprises, when the first estimation result obtained by using the first pattern recognition algorithm and the second estimation result obtained by using the second pattern recognition algorithm have different formats, identifying the object by synthesizing a first characteristic of the object estimated based on the first estimation result and a second characteristic of the object estimated based on the second estimation result.

16. The operation method of claim 10, wherein the identifying of the object comprises:

obtaining information about at least one from among a property, a state, a type, a component, and an appearance of the object from the first estimation result and the second estimation result; and identifying the object based on the obtained information.

17. An object recognition apparatus comprising:

a first spectrometer configured to obtain a first type of spectrum data from light scattered, emitted, or reflected from an object;

a second spectrometer configured to obtain a second type of spectrum data from the light scattered, emitted, or reflected from the object, the second type of spectrum data being different from the first type of spectrum data; and a processor configured to identify the object using a first pattern recognition algorithm that uses the first type of spectrum data as input data and a second pattern recognition algorithm that uses the second type of spectrum data as input data, wherein the processor is further configured to, when a first estimation result obtained by using the first pattern recognition algorithm and a second estimation result obtained by using the second pattern recognition algorithm have a same format, determine a final estimation result as a weighted sum of the first estimation result and the second estimation result.

18. An object recognition apparatus comprising:

a spectrometer configured to obtain spectrum data from light scattered, emitted, or reflected from an object;

an image sensor configured to obtain image data of the object; and a processor configured to identify the object using a first pattern recognition algorithm that uses the spectrum data as input data and a second pattern recognition algorithm that uses the image data as input data, wherein the processor is further configured to, when a first estimation result obtained by using the first pattern recognition algorithm and a second estimation result obtained by using the second pattern recognition algorithm have a same format, determine a final estimation result as a weighted sum of the first estimation result and the second estimation result.

* * * * *